(12) United States Patent
Swaminathan et al.

(10) Patent No.: US 11,049,112 B2
(45) Date of Patent: Jun. 29, 2021

(54) SYSTEMS AND METHODS FACILITATING CHARGEBACKS IN ELECTRONIC TRANSACTIONS

(71) Applicant: PayPal, Inc., San Jose, CA (US)

(72) Inventors: Jayaraman Swaminathan, Chennai (IN); Manvendra Sharma, Fremont, CA (US); Palaniyappan Kumarappan, Chennai (IN); Venkatraman Narayana Rao, Chennai (IN)

(73) Assignee: PAYPAL, INC., San Jose, CA (US)

( * ) Notice: Subject to any disclaimer, the term of this patent is extended or adjusted under 35 U.S.C. 154(b) by 7 days.

(21) Appl. No.: 16/044,936

(22) Filed: Jul. 25, 2018

(65) Prior Publication Data
US 2019/0362347 A1 Nov. 28, 2019

(51) Int. Cl.
*G06Q 10/08* (2012.01)
*G06Q 20/02* (2012.01)
*G06Q 30/06* (2012.01)
*G06Q 20/40* (2012.01)

(52) U.S. Cl.
CPC ....... *G06Q 20/407* (2013.01); *G06Q 10/0833* (2013.01); *G06Q 20/027* (2013.01); *G06Q 30/0609* (2013.01)

(58) Field of Classification Search
CPC ............. G06Q 20/407; G06Q 10/0833; G06Q 20/027; G06Q 30/0609; G06Q 20/40; G06Q 10/08; G06Q 20/02; G06Q 30/06
See application file for complete search history.

(56) References Cited

U.S. PATENT DOCUMENTS

| | | | | |
|---|---|---|---|---|
| 5,412,190 A | * | 5/1995 | Josephson | G06Q 20/02 235/379 |
| 5,995,948 A | * | 11/1999 | Whitford | G06Q 99/00 705/41 |
| 7,353,208 B1 | * | 4/2008 | Stambaugh | G06Q 20/04 380/247 |
| 7,356,516 B2 | * | 4/2008 | Richey | G06Q 10/087 705/80 |
| 8,073,785 B1 | * | 12/2011 | Candella | G06Q 20/342 705/75 |
| 8,209,341 B2 | * | 6/2012 | Lim | G06F 16/116 707/756 |

(Continued)

OTHER PUBLICATIONS

Preuveneers et al., "Scalable Enterprise Applications: Experiences with an E-Payment Case," 2016, Hawaii International Conference on System Sciences, pp. 5793-5802 (Year: 2016).*

*Primary Examiner* — Kenneth Bartley
(74) *Attorney, Agent, or Firm* — Haynes and Boone, LLP

(57) ABSTRACT

A method including: receiving a chargeback message from a processor (or offering the service to tenants who can submit chargeback details over APIs), selecting from a database data configuration parameters corresponding to the processor; receiving a first data file via a graphical user interface, wherein the first data file includes evidence responsive to the chargeback message; converting the first data file from a first format to a second format according to the data configuration parameters; after converting the first data file, generating a representment data structure that includes the first data file in the second format; and transmitting the representment data structure to the processor.

20 Claims, 9 Drawing Sheets

(56) References Cited

U.S. PATENT DOCUMENTS

| | | | | |
|---|---|---|---|---|
| 8,355,987 B2* | 1/2013 | Hirson | G06Q 20/023 | 705/40 |
| 8,631,346 B2* | 1/2014 | Petrovicky | G06F 16/10 | 715/809 |
| 8,688,579 B1* | 4/2014 | Ethington | G06Q 20/0425 | 705/42 |
| 9,760,871 B1* | 9/2017 | Pourfallah | G06Q 50/22 | |
| 9,779,392 B1* | 10/2017 | Prasad | G06Q 20/0425 | |
| 10,127,247 B1* | 11/2018 | Arora | G06T 1/0007 | |
| 2002/0120846 A1* | 8/2002 | Stewart | G06Q 20/04 | 713/168 |
| 2003/0233292 A1* | 12/2003 | Richey | G06Q 10/087 | 705/28 |
| 2004/0068464 A1* | 4/2004 | Buchanan | G06Q 20/042 | 705/38 |
| 2005/0027648 A1* | 2/2005 | Knowles | G06Q 20/04 | 705/38 |
| 2007/0250440 A1* | 10/2007 | Paulsen | G06Q 20/02 | 705/39 |
| 2008/0097810 A1* | 4/2008 | Sadowski | G06Q 10/06 | 705/7.12 |
| 2008/0097879 A1* | 4/2008 | Sadowski | G06Q 20/10 | 705/35 |
| 2008/0097897 A1* | 4/2008 | Sadowski | G06Q 40/02 | 705/38 |
| 2008/0169343 A1* | 7/2008 | Skaaksrud | G06Q 10/08 | 235/376 |
| 2010/0332271 A1* | 12/2010 | De Spong | G06Q 10/06 | 705/7.31 |
| 2011/0145351 A1* | 6/2011 | Lee | G06F 3/1206 | 709/206 |
| 2011/0313917 A1* | 12/2011 | Lawson | G06Q 20/102 | 705/40 |
| 2011/0313918 A1* | 12/2011 | Lawson | G06Q 20/102 | 705/40 |
| 2012/0158566 A1* | 6/2012 | Fok | G06Q 40/00 | 705/35 |
| 2012/0221468 A1* | 8/2012 | Kumnick | G06Q 20/20 | 705/44 |
| 2013/0297492 A1* | 11/2013 | Ertresvaag | G06Q 20/389 | 705/39 |
| 2015/0032626 A1* | 1/2015 | Dill | G06Q 20/385 | 705/44 |
| 2015/0046338 A1* | 2/2015 | Laxminarayanan | G06Q 20/38215 | 705/67 |
| 2015/0178708 A1* | 6/2015 | Reutov | G06Q 20/405 | 705/44 |
| 2016/0071069 A1* | 3/2016 | Skala | G06Q 20/4016 | 705/32 |
| 2017/0180454 A1* | 6/2017 | Sharma | H04L 67/22 | |
| 2019/0188218 A1* | 6/2019 | Harris | G06F 16/3344 | |
| 2019/0258972 A1* | 8/2019 | De Spong | G06Q 10/06 | |
| 2019/0279171 A1* | 9/2019 | Stewart | G06Q 20/108 | |
| 2019/0281133 A1* | 9/2019 | Tomkins | H04L 45/7457 | |

* cited by examiner

SYSTEMS AND METHODS FACILITATING CHARGEBACKS IN ELECTRONIC TRANSACTIONS

BACKGROUND

Field of the Disclosure

The present disclosure generally relates to electronic transaction processing, and more particularly, to systems and methods for generating and transmitting representment data structures in response to electronic transaction chargebacks.

Related Art

More and more consumers are purchasing items and services and/or otherwise conducting transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile transaction service provider such as, for example, PayPal, Inc. of San Jose, Calif. Such electronic transaction service providers can make transactions easier and safer for the parties involved. Conducting transactions with the assistance of a service provider from the convenience of virtually anywhere using a mobile device is one main reason why on-line and mobile transactions are growing very quickly.

An example related use case includes a consumer being dissatisfied with a purchase. For instance, the consumer may complain that a received item was damaged or that the item was never received. A consumer may have multiple choices in dealing with the complaint. In one instance, the consumer may go through an electronic transaction service provider, in which case the electronic transaction service provider may work to get resolution between the consumer and the merchant according to the processes of the electronic transaction service provider. Alternatively, the consumer may go directly to its credit card issuer. VISA™, MASTERCARD™ are card issuing companies, and the bodies that issue cards to the consumers are issuing banks. The consumer has the option of approaching the issuing bank with their problem. The credit card issuer sends a chargeback to the merchant via the card network which includes the card processor, an organization that contracts with the merchant's acquiring bank to process its card transactions. The merchant may then gather evidence and submit that evidence as part of its representment to the card processor. This representment flows thru the card processor and lands at the consumer's issuing bank. The credit card issuer may then adjudicate the chargeback according to its processes. For instance, if the consumer complained that the item was never delivered, but the merchant can prove that the item indeed was delivered, then the credit card issuer may adjudicate the chargeback in favor of the merchant. If the card issuing bank and the merchant acquiring bank do not come to an agreement about the chargeback, the final decision is made by the issuing credit card company.

In this process, different credit card processors (the organizations that contract with the merchant's acquiring bank to process card transactions and receive merchant responses on disputed card transactions) may each have their own requirements around the format in which they accept the representment information from the merchants. For instance, the credit card processors may only accept image data from a merchant in a particular image format, where that format may differ from processor to processor. Thus, for a merchant or for a service provider like PayPal, there is a need for systems and methods capable of handling chargebacks with a variety of different credit card processors.

Figure 1:
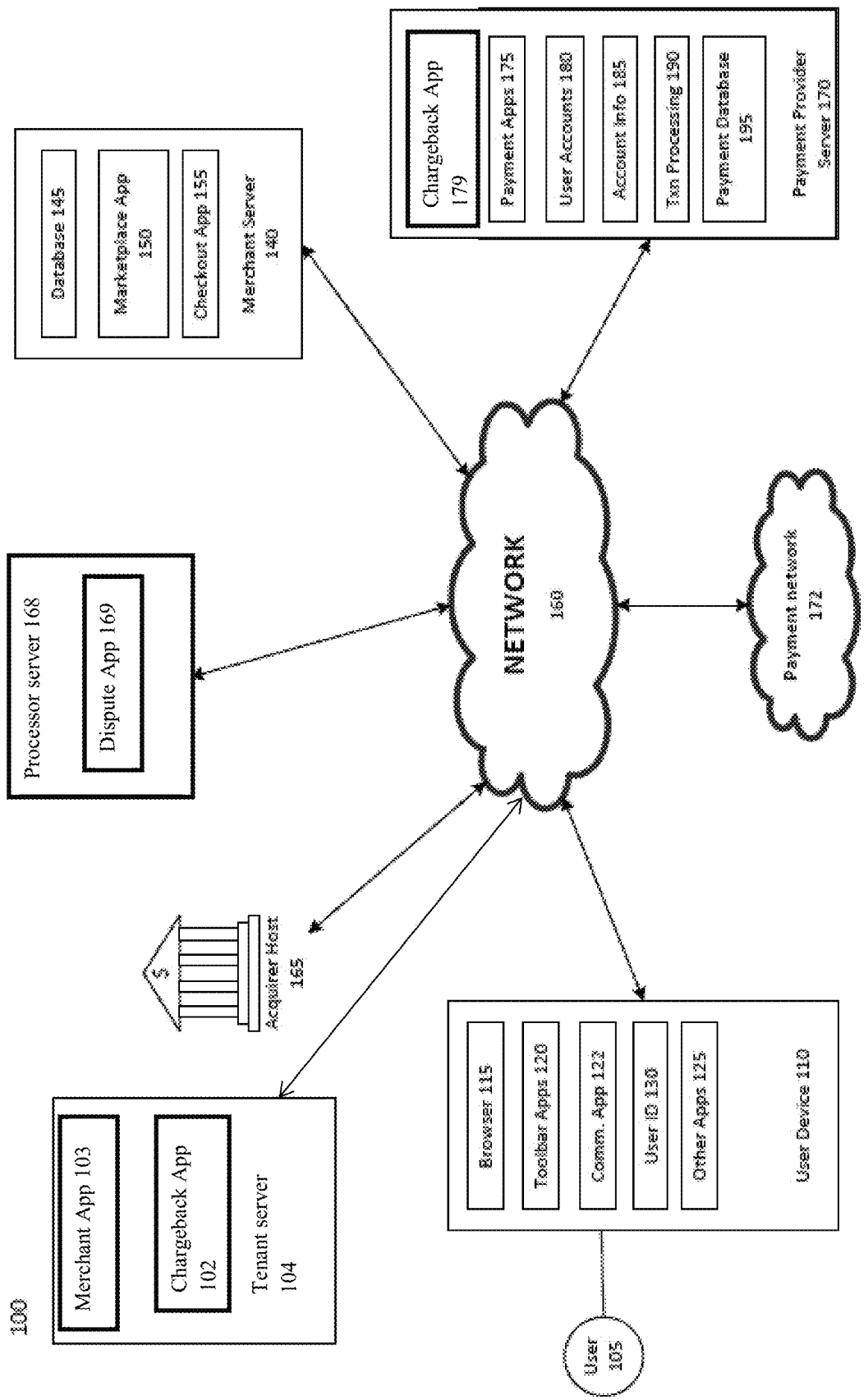
FIG. 1 is an illustration of an electronic processing system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for facilitating chargeback communications between at least one tenant or merchant and multiple credit card processors. Various embodiments provide, among other things, a chargeback facilitating application. The chargeback facilitation application may receive information from tenants or merchants over an Application Programming Interface (API) on a chargeback from any of a variety of different processors, along with the merchant's or tenant's choice of response to the chargeback and a list of supporting documents. The chargeback facilitation application may use configurations based on processor requirements to decide on a format and protocol (e.g., packaging, encryption, and transmission) for the information to be properly sets to the processor. Furthermore, the chargeback facilitation application may use automated systems to reformat the information received into a format required by the processor, package the information, and transmitted to the processor.

The chargeback facilitating application may be operable to receive a chargeback message from a credit card processor, parse that message into usable data for its own system, access a database of configurations deciding the response formats for that credit card processor, convert data into formats that are usable by the particular credit card processor, and generate and transmit a representment data structure to the credit card processor in an appropriate format. The chargeback facilitation application may be operable to provide such services with respect to a variety of different credit card processors, each of the credit card processors having different data format requirements.

In one example use case, a chargeback results in a chargeback message from a particular credit card processor to a merchant. In this example, the merchant (or a tenant with which the merchant is associated) may be a subscriber of a chargeback facilitation resource so that the chargeback message is transmitted to the chargeback facilitation application.

In response to receiving the chargeback message, the chargeback facilitation application accesses a database that includes data configuration parameters for a plurality of credit card processors. The chargeback facilitation application may then select from the database a subset of the data configuration parameters corresponding to the particular credit card processor.

Continuing with the example, the chargeback facilitation application may present a graphical user interface (GUI) on a computer display. In this example, the GUI may include an identification of the chargeback, which is associated with the chargeback message, and a request for data files regarding the chargeback. Examples of data files to be requested may include, e.g., business records, parcel shipping records, payment receipts, or any other information that may be useful for determining the merits of a consumer's complaint and chargeback request.

A human user or a robot may interact with the GUI to upload requested data files. For instance, the chargeback facilitation application may receive, via the GUI, a first data file. In some instances, there may be multiple data files that are relevant to the chargeback, and the GUI requests multiple data files and receives multiple data files from the human user or robot. In this example, the chargeback facilitation application offers an API that allows tenant systems to submit information about the chargeback messages received on the transaction processed on their platform, along with their chosen response to the processor and supporting documents.

As noted above, different credit card processors may have different requirements for the information it receives regarding a chargeback. In this example, a response from a merchant to a credit card processor regarding a chargeback is referred to as a representment. As such, different credit card processors may request that representments be submitted in certain ways. For instance, some credit card processors may require a coversheet describing the data submitted, some credit card processors may require specific image files (e.g., portable document format or PDF, tagged image file format or TIF, or the like), some credit card processors may require the list of chargebacks being represented in different formats like XML, flat file (different formats and data), some credit card processors may require that submitted files be zipped or otherwise encrypted, and on and on. Such requirements may be preprogrammed into a database of the data configuration parameters.

Continuing with the example, the chargeback facilitation application may convert the first data file from a first format to the second format according to the subset of the data configuration parameters for the particular credit card processor. For instance, the chargeback facilitation application may convert the first data file from a first type of file to a second type of file, may convert to the first data file from a first image type to a second image type, or the like. In this example, additional files that were uploaded by the human user or robot may also be converted according to the subset of the data configuration parameters.

After converting the first data file, the chargeback facilitation application may generate a representment data structure that includes the first data file in the second format and any other files that were reformatted (or not reformatted). As described in more detail below, the chargeback facilitation application may generate the representment data structure according to configuration requirements of the particular credit card processor.

In some embodiments, the chargeback facilitation application may have adjudication functionality included. For instance, after having received the data files and any other relevant information from the human user or robot, the chargeback facilitation application may parse the data to determine whether the transaction was completed appropriately. For instance, the chargeback facilitation application may parse an image file to read a parcel tracking number to determine that the parcel was, in fact, delivered and received by the disputing consumer and as promised by the merchant. In such an instance, the chargeback facilitation application may determine to challenge the chargeback in response to determining that the parcel has been received by the consumer.

Various embodiments may provide one or more advantages over related art systems. For instance, various embodiments of the present disclosure may provide an automated framework for merchants or other users to conform to a multitude of different formatting requirements by a variety of different credit card processors. Such automation may save time and increase efficiency, thereby adding value to a merchant or tenant who might otherwise not understand how to challenge a chargeback or might spend many man hours attempting to conform to formatting requirements. Furthermore, automation to determine a parcel status (e.g., delivered or not) based on image file uploads may significantly reduce an otherwise manual process, thereby increasing efficiency and ease. Various embodiments may solve a particular problem (e.g., keeping up with, and conforming to, different requirements of different credit card processors) that did not exist before the advent of Internet-based chargeback processes.

FIG. 1 is block diagram of a networked system suitable for implementing chargeback facilitation according to an embodiment. Networked system 100 may include a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, a payment provider server 170, an acquirer host 165, a credit card processor server 168, a tenant server 104, and a payment network 172 in communication over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. User 105 may utilize the device 110 to initiate a chargeback request as well. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, credit card processor server 168, tenant server 104, and payment network 172 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may install and execute a payment application received from the payment service provider to facilitate payment processes. The payment application may allow a user to send payment transaction requests to the payment service provider, where the payment application enables a transaction to be completed through user device 110.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

In this example, processor server 168 processes credit card transactions, either by itself or credit card transactions that are further processed through payment service provider server 170. Furthermore, user device 110 may allow for the user 105 to pay for a good or a service at the merchant server 140 either via direct use of a credit card or via a digital wallet managed by payment provider server 170, where the digital wallet stores information associated with the credit card. Thus, should the user dispute a purchase, the user may report the dispute through payment provider server 170 or credit card processor server 168 and chargeback application 169.

Tenant server 104 includes merchant application 103 and chargeback application 102. Merchant application 103 may correspond to a multitude of different merchants. For instance, tenant server 104 may provide a variety of different services to merchants, such as easy payment interfaces, check splitting, point-of-sale services, and the like. Such services may be provided to a variety of different merchants, including a merchant associated with merchant server 140, by the merchant application 103.

Tenant server 104 also includes chargeback application 102 (a chargeback facilitation application). As described further herein, chargeback application 102 may be used with chargeback application 179 (also a chargeback facilitation application) at payment provider server 170 to prepare representment documents.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, user names, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments. As such, transaction processing application 190 may store details of an order from individual users, including funding source used, credit options available, estimated delivery day(s), actual delivery date/time, description of the purchased item(s), etc. Payment application 175 may be further configured to determine the existence of and to manage accounts for user 105, as well as create new accounts if necessary.

In this example embodiment, chargeback application 179 is provided by payment provider server 170, and it interfaces with merchant application 103 and chargeback application 102 at tenant server 104. Chargeback application 179 (a chargeback facilitation application) works with the tenant server 104 to allow the merchant to challenge chargebacks and generate representment for a variety of different credit card processors. For instance, various embodiments may include merchant server 140 accepting payments from credit cards associated with processor server 168 as well as a variety of other processors and their servers. Merchant server 140 may subscribe to services from tenant server 104. Chargeback application 179 and chargeback application 102 may coordinate to allow the merchant associated with merchant server 140 to challenge chargebacks and generate representments for any given credit card processor, including the credit card processor associated with processor server 168.

Payment network 172 may be operated by payment card service providers or card associations, such as DISCOVER™, VISA™, MASTERCARD™, AMERICAN EXPRESS™, RuPAY™, China Union Pay™, etc. The payment card service providers may provide services, standards, rules, and/or policies for issuing various payment cards. A network of communication devices, servers, and the like also may be established to relay payment related information among the different parties of a payment transaction.

Credit card processor server 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank may include a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction. Note that while the description herein is mainly directed to credit card processors and entities, other processors and entities may also benefit from the embodiments, such as banks, a different online payment service provider than the one facilitating the chargeback resolution, and any other entity that processes a transaction between a user and a merchant or between a buyer and a seller of goods or services.

Figure 2:
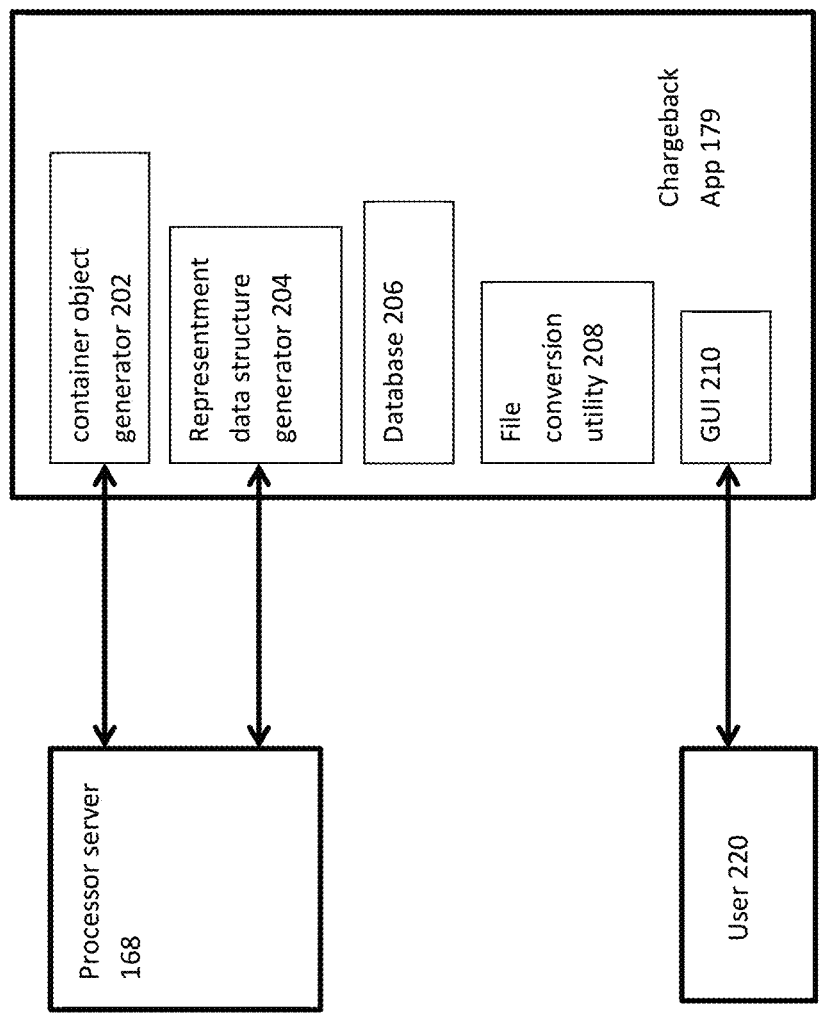
FIG. 2 is a schematic diagram of an example chargeback facilitation application according to the embodiment of FIG. 1.

FIG. 2 is another illustration of example chargeback application 179, according to one embodiment. Chargeback application 179 communicates with credit card processor server 168 and human or robot user 220. In one example, GUI 210 is a web interface and may be accessed using a web browser by either the tenant or merchant. In another embodiment, chargeback application 179 coordinates with chargeback application 102 at the tenant server 104 so that GUI 210 may be presented at the tenant server 104 using chargeback application 102.

In this example, the chargeback application 179 manages and facilitates chargebacks between different credit card processors and merchants. The chargeback application 179 stores a configuration file at database 206, where the configuration file includes requirements (e.g., file format, data structure, etc.) for each of the credit card processors, and provides computer integrations with servers (e.g., server 168) associated with the credit card processors. Upon receiving a credit card chargeback from a credit card processor, the chargeback application 179 creates a new case by initiating a new container object by use of container object generator 202. A notification may be transmitted by the chargeback application 179 to a server associated with a corresponding merchant (e.g., server 140 or tenant server 104) regarding the new credit card chargeback. The chargeback application 179 provides GUI 210 that enables the merchant or tenant (via user 220) to access the container object and to update the container object with evidence information associated with the chargeback.

The chargeback application 179 may analyze the evidence information received from the merchant. For example, the chargeback application 179 may perform different algorithms (e.g., object recognition algorithms, parsing algorithms) on the evidence information included in the container object, which may include images, videos, text, etc., to extract data relevant to the chargeback. Based on the extracted data, the chargeback application 179 may automatically generate a representment data structure, using representment data structure generator 204, where the representment data structure includes relevant information regarding the chargeback and the extracted data in a format according to requirements of the credit card processor. Some of the evidence may be in a format that is not accepted by a given credit card processor, and in which case, the file conversion utility 208 may perform format conversion (e.g., image format conversion to convert a TIFF image to a PDF image or more generally from one file type to another file type). The representment data structure generator 204 may compile the representment data structure with other representment data structures intended for the credit card processor before submitting the representment data structures in a batch to credit card processor server 168 associated with the credit card processor. The chargeback application may communicate with the merchant or tenant and with the credit card processor using a multitude of different APIs.

Figure 3:
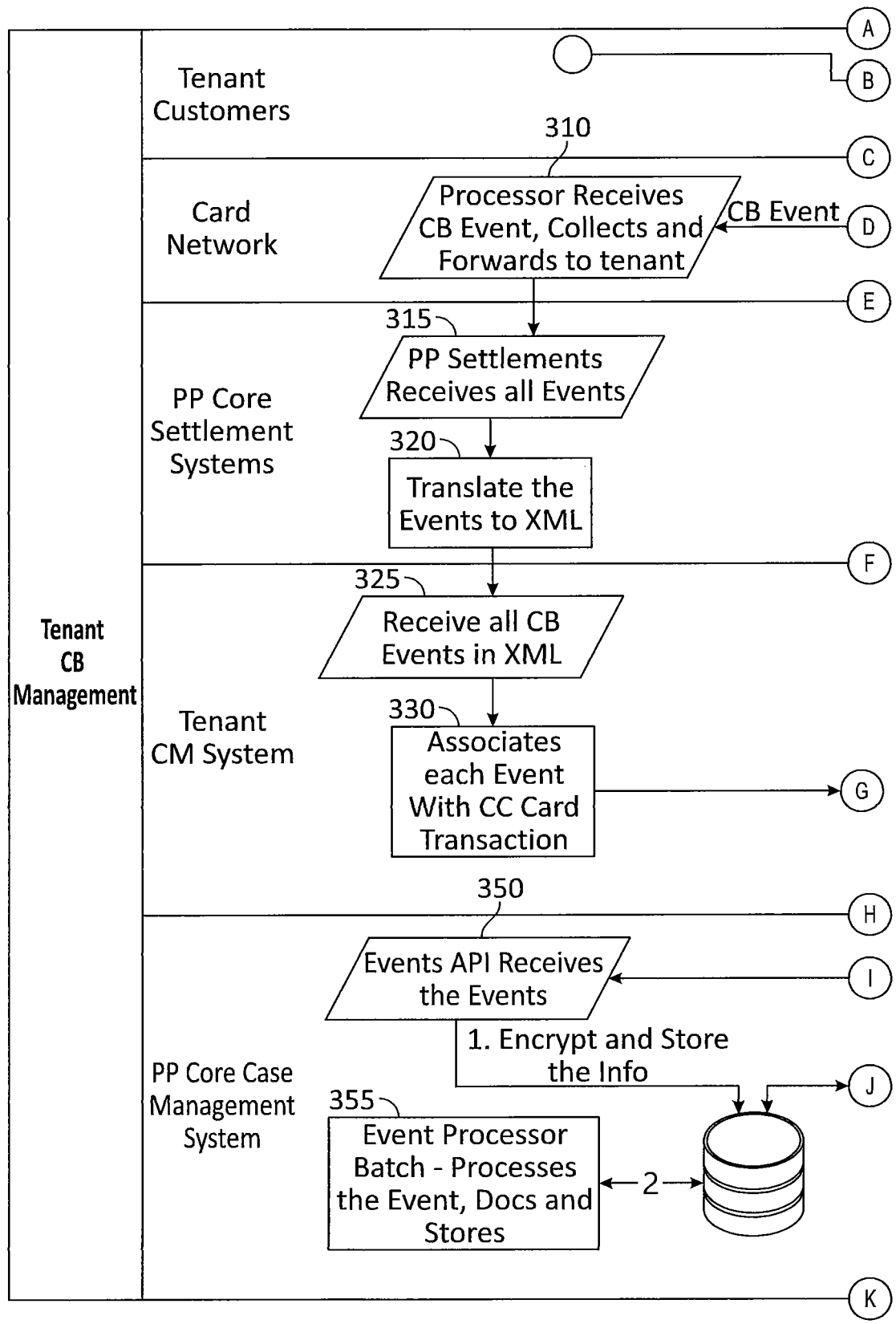
FIG. 3 is a process diagram of an example technique for facilitating a chargeback, according to one embodiment.
Figure 3:
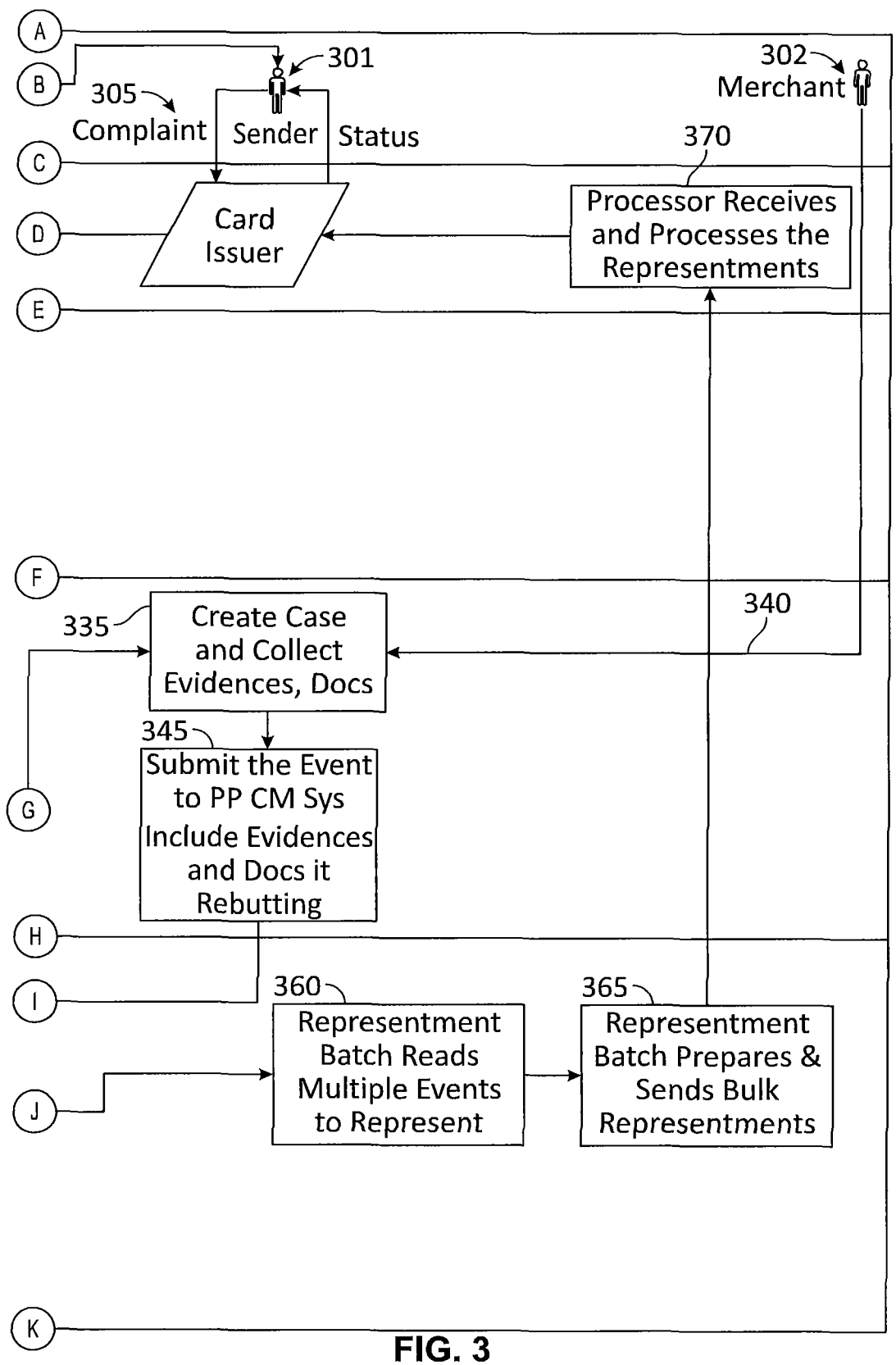

FIG. 3 is a process diagram, adapted according to one embodiment, and illustrating a chargeback method 300 using the system of FIG. 1. At action 305, the credit card issuer receives a complaint from the sender 301. For instance, the sender 301 may be a consumer who is dissatisfied with a purchase, examples including that a purchase was never received, that an item was broken when it was delivered, that a garment was the wrong color or size, and the like. The sender 301 may present the complaint to the card issuer in any manner, such as by phone, through a digital application, or the like. In this example, the card issuer may correspond to the card issuer associated with the credit card processor server 168 of FIG. 1.

The credit card issuer creates a complaint file in its own system, collects any relevant data that it may have (e.g., a transaction number, purchase price, date, account number, and the like), generates a chargeback message, and transmits the chargeback message to the payment provider server 170. This is illustrated at action 310. In some examples, the credit card issuer may transmit the chargeback message to the payment provider server 170 using any of a variety of methods, such as by file transfer protocol (FTP) or a file sharing service.

At action 315, the payment provider server 170 receives the chargeback message and uses a file parsing system, which allows the payment provider server 170 to read the chargeback file and extract information from it. For instance, the payment provider server 170 may use a text-reading program to extract relevant information from the chargeback message and then to generate a structured file for its own system from that relevant information. For instance, the payment provider server 170 may create a flat file, a fixed-length file, an extensible markup language (XML), and/or another type of structured file based on the relevant information at action 320. Thus, action 315 and 320 represent preliminary processing at the payment provider server 170 of the chargeback. Action 320 may also include placing the structured file (e.g., the XML file) in a database (not shown) of the payment provider's own system.

The following actions (325-365) may be performed by the chargeback application 179 in coordination with the chargeback application 102 or by the chargeback application 179 alone. In other words, various actions described herein may be distributed between the tenant server 104 and the payment service provider server 170 as appropriate for a given system.

At action 325 and 330, the chargeback application 179 receives the structured file and associates the chargeback with one or more electronic transactions. For instance, the chargeback application 179 may access a database of electronic transactions using information from the structured file to find the particular one or more electronic transactions that are the subject of the chargeback. In one example, the chargeback application 179 may search the database to find the particular electronic transactions by using an appropriate key, such as credit card account number, user identifiers, transaction numbers, and the like.

At action 335, chargeback application 179 then creates a case, for instance a container object associated with the chargeback, in response to receiving the chargeback message. The chargeback application 179 uses the container object to collect evidence and documents to prepare the representment. Furthermore, the chargeback application 179 may access its configuration database 206 to retrieve particular configuration requirements of the particular credit card processor to be applied to the chargeback. The application of such requirements is described in more detail with respect to subsequent actions depicted in FIG. 3.

According to certain embodiments, the case container may include a data structure that is presented to the merchant 302 by the web interface, and the merchant 302 may upload their data into the case container. Chargeback application 179 provides GUI 210, and for a given merchant GUI 210 presents that merchant's outstanding chargebacks in a visual format with each chargeback being indicated by a visual item. GUI 210 may provide a visual walkthrough that facilitates a process for the merchant 302 to upload relevant information (e.g., evidence to support the merchant's dispute) for a given case container. Examples of such information may include proof of delivery with signature (e.g., electronic receipts and/or images of the proof of delivery), shipping receipts, parcel shipping labels, image(s) of delivered item(s), and the like. Chargeback application 179 is programmed to handle a variety of different types of chargebacks. Thus, depending on the reason the chargeback was created, GUI 210 may request different types of information. For instance, if the sender 301 claims that they never received ordered goods, then GUI 210 may request proof of shipment or proof of delivery from the merchant 302. Of course, different kinds of chargebacks may exist, and the chargeback application 179 is programmed to request from the merchant 302 any relevant information that might prove that the merchant 302 provided the goods or services as specified by the terms of the transaction.

In some examples, the information that the merchant 302 uploads to the GUI 210 may include images. Examples of images may include PDF, TIFF, joint photographers exhibit group (JPEG) files or other appropriate files or objects. The images may include native images, screenshots, photos, or the like of various kinds of information, such as shipping receipts, shipping labels, order forms, payment receipts, images of the item(s) or box at a location that enables the location to be determined, etc. As noted above, different credit card processors may have different requirements for information that is uploaded in a representment data structure. Thus, chargeback application 179 may provide format conversion services to convert one image type to another image type, one file type to another file type, or the like. In one example, if merchant 302 uploads a PDF file to GUI 210, but the configuration database 206 indicates that the credit card processor only accepts TIFF images, then GUI 210 would allow merchant 302 to upload the PDF file, and then file conversion utility 208 would convert the PDF image to a TIFF image. The chargeback application 179 may perform other kinds of re-formatting on an image, including image resolution formatting, orientation formatting, aspect ratio formatting, color content formatting, file size formatting, and the like.

As the merchant 302 uploads the requested data, the chargeback application 179 may parse the uploaded data using, e.g., text recognition, to then access other Internet resources to supplement the uploaded information. Thus, in one example the merchant 302 uploads an image that includes a parcel tracking number. The chargeback application 179 automatically gathers data from image, such as analyzing the image for alphanumeric characters and text strings to extract parcel tracking numbers and the like. However, if it is difficult to read the tracking number, the chargeback application 179 may indicate a request for human intervention. Continuing with this example, the chargeback application 179 may configured to identify an appropriate tracking website that can provide details about the shipment, navigate to that website, take a snapshot of the a webpage associated with the website that shows the current tracking status, and/or parse any text data corresponding to the webpage or website to determine the current tracking status.

Furthermore, the chargeback application 179 may provide some adjudication functionality that it applies to the uploaded or otherwise acquired information. For instance, chargeback application 179 may automatically determine whether the merchant is at fault based on whether the status of the shipment was indicated as delivered or not delivered. In fact, the chargeback application 179 may determine to either dispute or to accept the chargeback based on the information uploaded or otherwise acquired.

At action 345, the collected information is sent to the representment data structure generator 204. The representment data structure generator 204 performs further manipulation of the data to place it into a format that is acceptable to the particular credit card processor and according to configuration parameters accessed from the configuration database 206. In some examples, different processors may require different encapsulations for the data files of representment data structures. For instance, some credit card processors may require that the files be zipped, some may require that information describing the images be laid out in one file and the images themselves be saved in different files that are then zipped together. The files may be encrypted or not. Other processors may require that the representment be sent as an email with information describing the images in the body of the email with the images saved as attachments to the email. This is shown at actions 350 and 355.

At actions 360 and 365, chargeback application 179 batches a multitude of different representment data structures (e.g., files or emails, as described above) and transmits the batched representment data structures to the credit card processor server 168. The representment data structures may be transmitted to the credit card processor server 168 using any appropriate protocol. For instance, the chargeback application 179 may use FTP, email, network data mover (NDM) or other appropriate protocol to transmit the representment data structures to the credit card processor server 168.

Once chargeback application 179 sends the representment data structures to the processor server 168, the processor server 168 checks the formats of the various representment data structures in the batch and then may send an acknowledgment back to the chargeback application 179. This may be a basic acknowledgment that is based on receiving the files in a particular format, e.g., the processor server 168 may parse the representment data structures in the batch and check the format of the data but not the underlying informational substance of the data. The chargeback application 179 processes the acknowledgment. If an acknowledgment shows that a case is not in the correct format, then the chargeback application 179 may then re-format the data and re-send accordingly.

In some embodiments there may be a single acknowledgment for an entire batch. In other embodiments, there may be an acknowledgment for each of the representative data structures in the batch.

Upon receiving an acknowledgment, the chargeback application 179 may then report it to the merchant 302. Also, when the acknowledgment is received, the chargeback application 179 may also update the state of the case in the container object, by updating the status to indicate that it has been acknowledged by the processor server 168. Furthermore, the chargeback application 179 may further send a message to the merchant to indicate the acknowledgment. In fact, at various status changes, the chargeback application 179 may update a case status of the container file and send an update status message to GUI 210 for the merchant.

Figure 4:
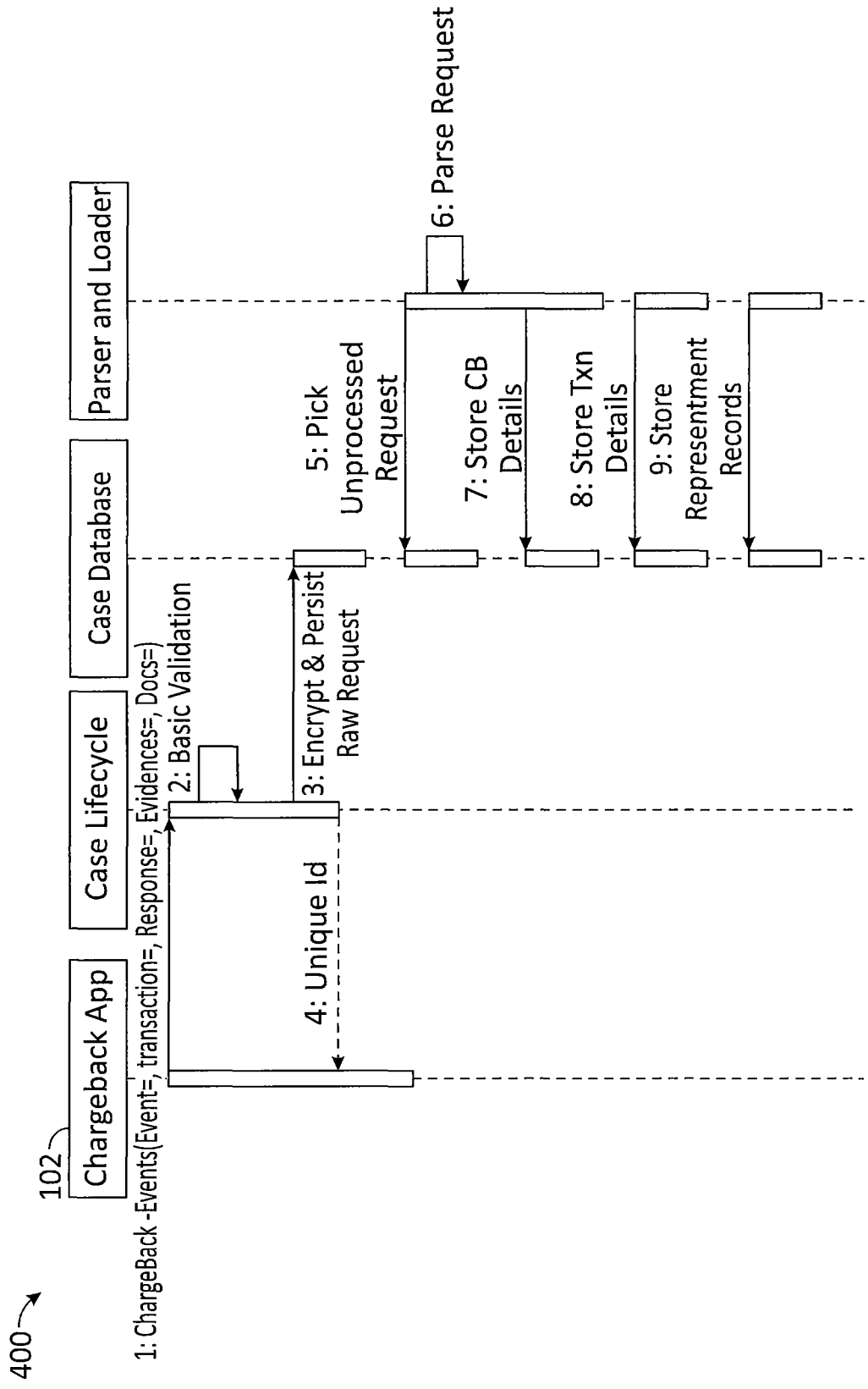
FIGS. 4-6 are illustrations of various methods that may occur as the process of FIG. 3 is carried out, according to one embodiment.

FIG. 4 is an illustration of a process 400 for submission of chargeback event details according to one embodiment. The various actions 1-9 of process 400 may be performed by a combination of the tenant server 104 (and, in particular, the chargeback application 102) and the payment provider server 170 (the case lifecycle, the case database, and the parser and loader). Process 400 applies to a variety of different types of data that may be presented by the merchant to the chargeback application 179 via the GUI 210. For instance, as noted above, the merchant may upload images; however the merchant may provide other information. Examples of other information may include text strings to identify a transaction, text strings to identify a piece of evidence or a document, text strings to provide comments on the representment, etc. As those types of information are provided at action 1, the case lifecycle module does a basic validation, and if the information is valid, sends that information on as an encrypted raw request to the case database at action 3. For a piece of information, the case lifecycle module may generate a unique identification and provide that unique identification back to the chargeback application 102 at action 4. The case database makes raw requests available to the parser and loader, which loads and parses the requests from a queue at the case database at actions 5-9.

Figure 5:
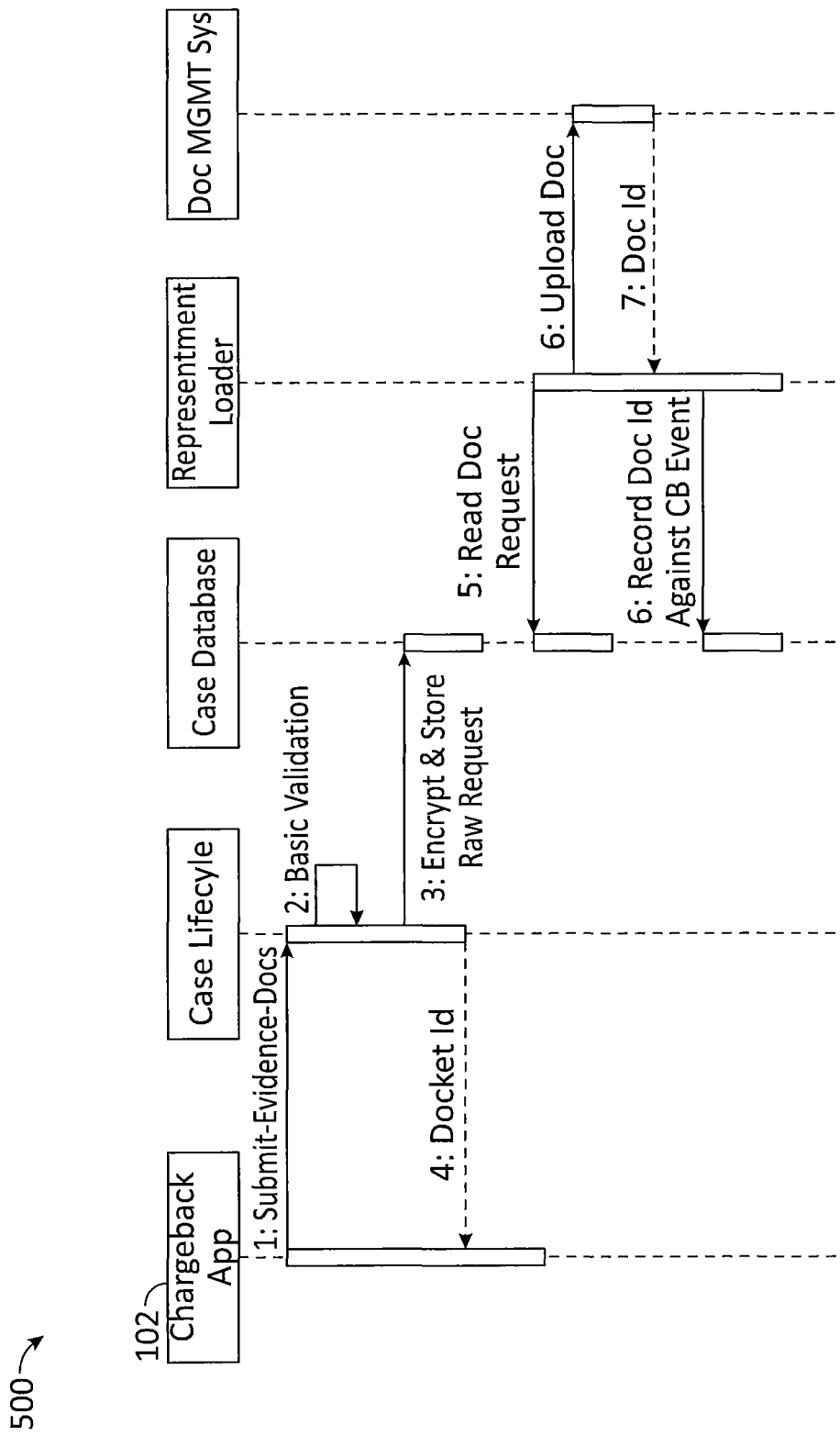

FIG. 5 is an illustration of a process 500 for submission of supporting representment documents, according to one embodiment. The various actions 1-8 of process 500 may be performed by a combination of the tenant server 104 (and, in particular, the chargeback application 102) and the payment provider server 170 (the case lifecycle, the case database, the representment loader, and the document management system). At action 1, the merchant uploads a document, and the case lifecycle module performs a basic validation at action 2. At action 3, the case lifecycle module encrypts the document and stores a raw request that the case database. The case lifecycle module provides a document reference ID to the chargeback application 102 at action 4. The representment loader takes raw requests from a queue at the case database, and at action 5, it reads the document request and then uploads the document at action 6. The document management system creates a document ID for the document at action 7 and then records that document ID against the chargeback event at action 8 in the case database.

Figure 6:
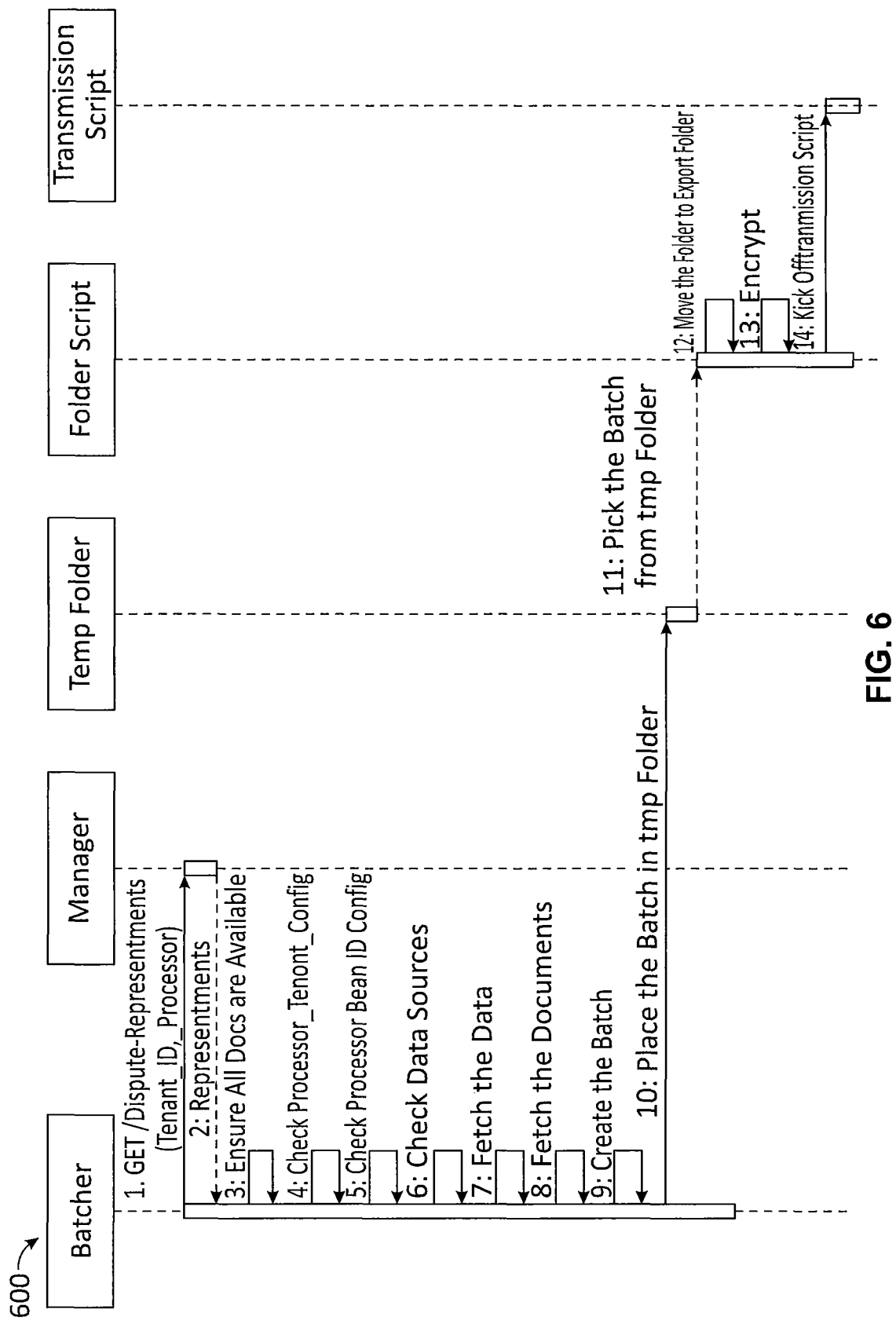

FIG. 6 is an illustration of the process 600 for batching and transmitting representment data structures, according to one embodiment. The various actions 1-14 of process 600 may be performed by chargeback application 179 after the relevant data has been uploaded from the merchant. At actions 1-9, the batcher works with the manager to access a multitude of different representment data structures destined for a same credit card processor. A batch may include as few as one representment data structure or as many representment data structures as may be allowed at one time by the credit card processor server 168. At action 10, the batcher places the batch of representment data structures into the temp folder. The folder script retrieves the batched representment data structures at action 11. At actions 12-14, the folder script moves the batch to export folder, encrypts the batch, and initiates the transmission script to transmit the batch of representment data structures to the credit card processor server 168.

Figure 7:
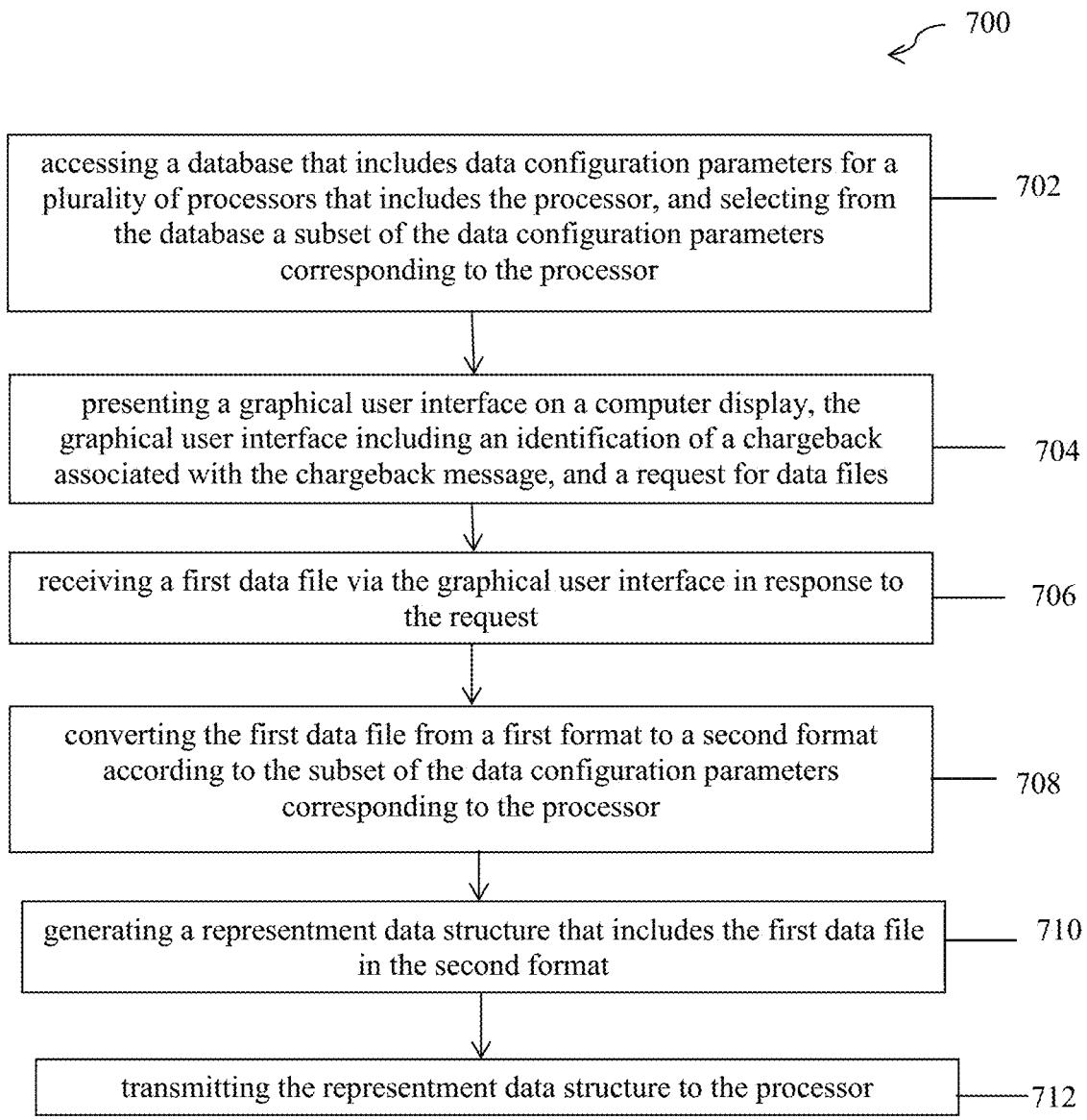
FIG. 7 is a flow chart illustrating an embodiment of a method for facilitating chargebacks, according to one embodiment.

FIG. 7 is an illustration of an example method 700, adapted according to one embodiment. The actions of method 700 may be performed by one or more servers (e.g., servers 170 and/or 104). Specifically, the various actions of method 700 may be performed either by chargeback application 179 by itself or in concert with chargeback application 102. The various actions are provided by the servers as a result of executing computer-readable code by one or more processors, wherein the computer-readable code includes instructions. Method 700 in this example is a method for facilitating a chargeback by allowing a merchant to submit evidence and then generating and transmitting a representment data structure to a credit card processor server.

At action 702, chargeback application 179 accesses a database. In this example, the database may include data configuration parameters for a plurality of credit card processors. The data configuration parameters may include a variety of different requirements for the credit card processors. The requirements may specifically relate to the format of a representment in response to a chargeback. Action 702 also includes selecting from the database a subset of the data configuration parameters that specifically correspond to a particular credit card processor from whom a chargeback message was received. For instance, the chargeback application 179 may use an identity of the particular credit card processor as a key to search the database for configuration parameters.

At action 704, chargeback application 179 presents a GUI on a computer display, where in the GUI includes an identification of the chargeback associated with the chargeback message and a request for data files. An example of such a GUI includes GUI 210 of FIG. 2. In this example, the GUI identifies for a user the chargeback (e.g., a chargeback identification number and a reason for the chargeback). The GUI also includes a request for data files, which may be presented in a format that walks the user through which data files are requested and including instructions for uploading the data files. In some embodiments, action 704 may also include transmitting a notification of the chargeback to the merchant to alert the merchant to check the GUI.

Additionally, action 704 may also include creating a container object in response to receiving the chargeback message. The container object may include a file or multiple files or one or multiple database records or other appropriate object that represents the chargeback for purposes of the chargeback application 179. For instance, as information is added or case status updated, the container object may also be updated accordingly.

At action 706, the chargeback application 179 receives a first data file via the GUI in response to the request for data files. Examples of data files may include images for shipping receipts, payment receipts, and the like.

At action 708, chargeback application 179 converts the first data file from a first format to a second format. This conversion is performed according to the subset of data configuration parameters from action 702 (above). Examples of converting the first data file from a first format to the second format are provided above with respect to FIG. 3. For instance, the first data file may be converted from a first file type to a second file type, which may include converting the first data file from a first image type to a second image type. Such converting may also include parsing an image for text string data and providing that text string data in addition to the image.

At action 710, the chargeback application 179 generates a representment data structure that includes the first data file in the second format. Examples of representment data structures are described above, including files, emails with file attachments, and the like. The representment data structures may include data provided by the merchant as well as explanatory data in a format as required by the configuration parameters for that particular processor. Furthermore, some embodiments may include encrypting the representment data structure.

The process of generating the representment data structure, including receiving the first data file and converting the first data file, may include updating the container object. For instance the chargeback application 179 may update the container object as the first data file (and any other data files) are uploaded. Furthermore, in any action were data is added or changed, the chargeback application 179 may update the container object so that the container object itself includes up-to-date information.

An action 712, the chargeback application 179 then transmits the representment data structure to the processor server. In some examples, the representment data structure may be batched with other representment data structures for the same credit card processor and transmitted in a single batch.

Various embodiments are not limited to the particular actions depicted in FIG. 7. Instead, other embodiments may add, omit, rearrange, or modify various actions. For instance, the chargeback application 179 may include some adjudication capability so that upon receipt of the first data file, the chargeback application 179 may for example determine that a parcel has been received by the party initiating the chargeback. The chargeback application 179 may then further determine to challenge the chargeback in response to determining that the parcel has been received. Otherwise, in other examples, the chargeback application 179 may decide to accept the chargeback if the merchants cannot provide evidence showing that a good or service was provided according to details of the transaction.

Furthermore, some embodiments may also include parsing the first data file for useful information. An example of useful information includes a parcel shipping number relevant to the chargeback. The chargeback application 179 may then access a web interface of the parcel delivery service using the parcel shipping number to acquire a parcel status. The chargeback application 179 may include that parcel status update the container object for the case to include the parcel status so that eventually the parcel status is provided in the representment data structure.

Method 700 may be repeated for a different credit card processor having different requirements. Method 700 may be expected to provide similar results for the merchant—a representation conforming to format requirements of the particular credit card processor.

Figure 8:
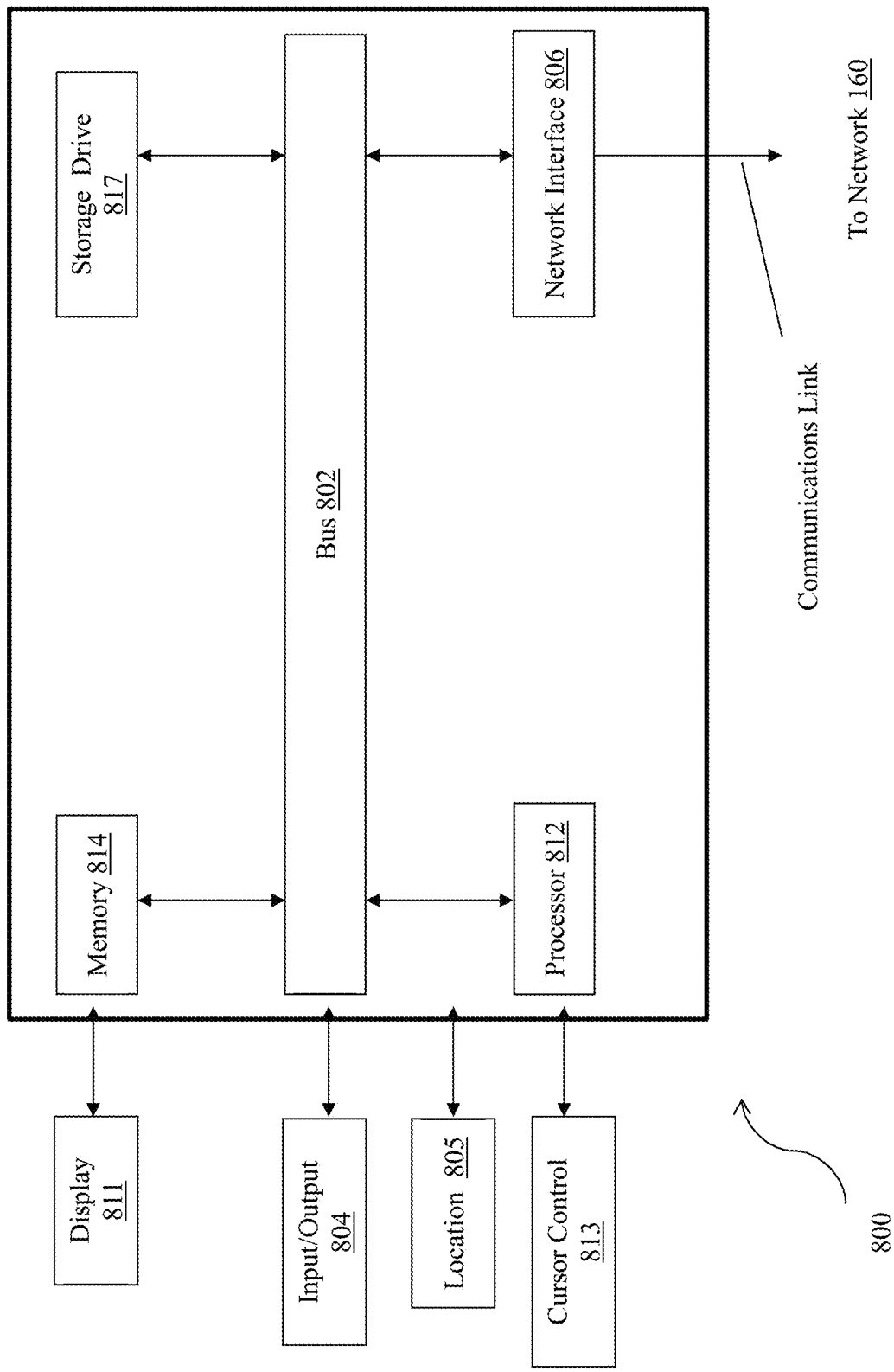
FIG. 8 is an illustration of an example computer system that may be used as a user device, a service provider server, or a merchant device and to perform the actions described with respect to FIGS. 1-7, according to one embodiment.

Referring now to FIG. 8, an embodiment of a computer system 800 suitable for implementing, for example, the computing devices 104, 110, 140, 168, and 170 of FIG. 1 discussed above. It should be appreciated that other devices utilized in the system discussed above may be implemented as the computer system 800 in a manner as follows.

In accordance with various embodiments of the present disclosure, computer system 800, such as a smart phone, computer, and/or a network server, includes a bus 802 or other communication mechanism for communicating information, which interconnects subsystems and components, such as a processing component 812 (e.g., processor, microcontroller, digital signal processor (DSP), etc.), a system memory component 814 (e.g., RAM) a storage drive component 817 (e.g., solid-state, hard drive, or optical), a network interface component 806 (e.g., wireless card, modem, or Ethernet card), a display component 811 (e.g., a touchscreen, CRT, or LCD), an input/output component 804 (e.g., keyboard, keypad, a touchscreen), a cursor control component 813 (e.g., mouse, pointer, or trackball), and/or a location determination component 805 (e.g., a Global Positioning System (GPS) device as illustrated, a cell tower triangulation device, and/or a variety of other location determination devices known in the art). In one implementation, the storage drive component 817 may comprise a database having one or more storage drive components.

In accordance with embodiments of the present disclosure, the computer system 800 performs specific operations by the processor 812 executing one or more sequences of instructions contained in the memory component 814, such as described herein with respect to FIGS. 1-7 discussed above. Such instructions may be read into the system memory component 814 from another computer readable medium, such as storage drive 817. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 812 for execution. Such a medium may take many forms, including but not limited to, non-volatile media and volatile media. In various implementations, non-volatile media includes hard drive or solid state drives, such as the storage drive component 817, and volatile media includes dynamic memory, such as the system memory component 814.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of the computer systems 800 coupled by a communication link 818 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 818 and the network interface component 806. The network interface component 806 may include an antenna, either separate or integrated, to enable transmission and reception via the communication link 818. Received program code may be executed by processor 812 as received and/or stored in storage drive component 817 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
in response to receiving a chargeback message from a card processor, accessing a database that includes data configuration parameters for a plurality of card processors that includes the card processor;
selecting, from the database, a subset of the data configuration parameters corresponding to the card processor, the subset of the data configuration parameters comprising a data file type for processing by the card processor;
presenting a graphical user interface on a computer display, the graphical user interface including an identification of a chargeback associated with the chargeback message, and a request for data files regarding the chargeback;
receiving, via the graphical user interface in response to the request, a container object comprising a first data file including a parcel image of a parcel associated with the chargeback message;

extracting data from the first data file using an object recognition process with the container object;

converting the first data file from a first format to a second format according to the subset of the data configuration parameters corresponding to the card processor based on the extracted data, wherein the converting includes compiling the extracted data in the second format;

generating a representment data structure that includes the first data file in the second format;

determining a parcel tracking number from the parcel image using a text recognition process;

determining a parcel shipping website associated with tracking the parcel using the parcel tracking number;

capturing a snapshot of a current tracking status of the parcel from the parcel shipping website using the parcel tracking number;

adding the snapshot to the representment data structure;

transmitting the representment data structure to the card processor; and receiving, from the card processor, an acknowledgement response associated with a receipt of the representment data structure by the card processor.

2. The system of claim 1, wherein the operations further comprise:

receiving information from a user, the information defining a response to the chargeback and providing a list of supporting documents, the supporting documents including the first data file, via an Application Programming Interface (API).

3. The system of claim 1, wherein the operations further comprise:

creating the container object in response to receiving the chargeback message, wherein the container object corresponds to the chargeback.

4. The system of claim 3, wherein the operations further comprise:

updating the container object to include the first data file in the second format.

5. The system of claim 1, wherein the operations further comprise:

in response to receiving the chargeback message, transmitting a notification to a party responsible for providing the first data file to the graphical user interface, wherein the notification indicates existence of the chargeback.

6. The system of claim 1, wherein transmitting the representment data structure comprises:

batching a plurality of representment data structures with the representment data structure.

7. The system of claim 1, wherein converting the first data file comprises:

parsing text data from an image within the first data file; and including the text data from the image within the representment data structure.

8. The system of claim 1, wherein converting the first data file comprises:

converting the first data file from a first image type to a second image type.

9. The system of claim 1, wherein transmitting the representment data structure to the card processor comprises:

encrypting the representment data structure prior to the transmitting.

10. The system of claim 1, wherein the operations further comprise:

in response to capturing the snapshot, parsing the snapshot to determine that the parcel has been received by a third-party, wherein the third-party is an initiator of the chargeback; and determining to challenge the chargeback in response to determining that the parcel has been received by the third-party.

11. A method comprising:

receiving, by an application of a payment provider server, a chargeback message, the chargeback message indicating a chargeback by a user of a transaction processed by a card processor of the transaction;

accessing a database that includes data configuration parameters for a plurality of card processors that includes the card processor;

selecting, from the database, a subset of the data configuration parameters corresponding to the card processor, the subset of the data configuration parameters comprising a data file type for processing by the card processor;

presenting a graphical user interface on a computer display, the graphical user interface including an identification of a chargeback associated with the chargeback message, and a request for data files regarding the chargeback;

receiving, via the graphical user interface responsive to the request, a container object comprising a first data file including a parcel image of a parcel associated with the chargeback message;

extracting data from the first data file using an object recognition process with the container object;

converting the first data file from a first format to a second format according to the subset of the data configuration parameters corresponding to the card processor based on the extracted data, wherein the converting includes compiling the extracted data in the second format;

generating a representment data structure that includes the first data file in the second format;

determining a parcel tracking number from the parcel image using a text recognition process;

determining a parcel shipping website associated with tracking the parcel using the parcel tracking number;

capturing a snapshot of a current tracking status of the parcel from the parcel shipping website using the parcel tracking number;

adding the snapshot to the representment data structure;

transmitting the representment data structure to the card processor; and receiving, from the card processor, an acknowledgement response associated with a receipt of the representment data structure by the card processor.

12. The method of claim 11, wherein the chargeback indicates that the parcel was not delivered according to a transaction.

13. The method of claim 12, further comprising:

receiving information from the user, the information defining a response to the chargeback and providing a list of supporting documents, the supporting documents including the first data file, via an Application Programming Interface (API).

14. The method of claim 12, further comprising:

in response to capturing the snapshot, parsing the snapshot to determine that the parcel has been received by a third-party, where the third-party is an initiator of the chargeback; and determining to challenge the chargeback in response to determining that the parcel has been received by the third-party.

15. The method of claim 11, wherein converting the first data file comprises:
converting the first data file from a first image type to a second image type.

16. The method of claim 11, wherein the method is performed by a payment provider server separate from the card processor and separate from a merchant identified by the chargeback message.

17. A non-transitory machine readable medium having stored thereon machine readable instructions executable to cause a machine to perform operations comprising:
receiving a chargeback message, the chargeback message indicating a chargeback with a card processor;
accessing a database that includes data configuration parameters for a plurality of card processors that includes the card processor;
selecting, from the database, a subset of the data configuration parameters corresponding to the card processor, the subset of the data configuration parameters comprising a data file type for processing by the card processor;
presenting a graphical user interface on a computer display, the graphical user interface including an identification of a chargeback associated with the chargeback message, and a request for data files regarding the chargeback;
receiving, via the graphical user interface responsive to the request, a container object comprising a first data file including a parcel image of a parcel associated with the chargeback message;
extracting data from the first data file using an object recognition process with the container object;
converting the first data file from a first format to a second format according to the subset of the data configuration parameters corresponding to the card processor based on the extracted data, wherein the converting includes compiling the extracted data in the second format;
generating a representment data structure that includes the first data file in the second format;
determining a parcel tracking number from the parcel image using a text recognition process;
determining a parcel shipping website associated with tracking the parcel using the parcel tracking number;
capturing a snapshot of a current tracking status of the parcel from the parcel shipping website using the parcel tracking number;
adding the snapshot to the representment data structure;
transmitting the representment data structure to the card processor; and
receiving, from the card processor, an acknowledgement response associated with a receipt of the representment data structure by the card processor.

18. The non-transitory machine readable medium of claim 17, wherein the operations further comprise:
batching the representment data structure before the transmitting.

19. The non-transitory machine readable medium of claim 17, wherein the operations further comprise:
receiving information from a user, the information defining a response to the chargeback and providing a list of supporting documents, the supporting documents including the first data file, via an Application Programming Interface (API).

20. The non-transitory machine readable medium of claim 17, wherein the first format comprises a first image file type and wherein the second format comprises a second image file type.

* * * * *